United States Patent
Suh et al.

(10) Patent No.: US 9,521,831 B2
(45) Date of Patent: Dec. 20, 2016

(54) APPARATUS FOR REMOVING EGGS FROM EGG CARRIERS, AND ASSOCIATED METHOD

(71) Applicant: Zoetis Services LLC, Florham Park, NJ (US)

(72) Inventors: William Dongwook Suh, Cary, NC (US); Scott Joseph Agostinelli, Cary, NC (US)

(73) Assignee: Zoetis Services LLC, Parsippany, NJ (US)

(*) Notice: Subject to any disclaimer, the term of this patent is extended or adjusted under 35 U.S.C. 154(b) by 0 days.

(21) Appl. No.: 14/566,786

(22) Filed: Dec. 11, 2014

(65) Prior Publication Data

US 2015/0166267 A1 Jun. 18, 2015

Related U.S. Application Data

(60) Provisional application No. 61/917,155, filed on Dec. 17, 2013.

(51) Int. Cl.
*A01K 45/00* (2006.01)
*A01K 43/00* (2006.01)

(52) U.S. Cl.
CPC .............. *A01K 45/007* (2013.01); *A01K 43/00* (2013.01)

(58) Field of Classification Search
CPC ...... A01K 45/007; A01K 45/00; A01K 43/00; A01K 43/04; A01K 43/005; A01K 11/006
See application file for complete search history.

(56) References Cited

U.S. PATENT DOCUMENTS

| | | | |
|---|---|---|---|
| 3,506,140 A | 4/1970 | Koch et al. | |
| 4,681,063 A | 7/1987 | Hebrank | |
| 5,017,003 A | 5/1991 | Keromnes et al. | |
| 5,898,488 A | 4/1999 | Kuhl | |
| 6,145,668 A | 11/2000 | DePauw et al. | |
| 6,149,375 A | 11/2000 | Hebrank | |
| 6,454,101 B1 * | 9/2002 | Doornekamp | A01K 43/00 198/779 |
| 7,083,208 B2 | 8/2006 | Ilich | |
| 2013/0319335 A1 * | 12/2013 | Hebrank | A01K 43/00 119/6.8 |

OTHER PUBLICATIONS

PCT International Search Report and Written Opinion, International Application No. PCT/US2014/070489, Date of Mailing Mar. 20, 2015.

* cited by examiner

*Primary Examiner* — Kaitlin Joerger
(74) *Attorney, Agent, or Firm* — Scott C. Mayhew

(57) ABSTRACT

An apparatus for removing eggs from an egg carrier is provided. Such an apparatus includes a frame and an egg lifting system having an array of egg lifting devices configured to lift eggs from the egg carrier. A platform assembly has a platform configured to be moveably positioned between the array of egg lifting devices and the egg carrier. In this manner, the platform is capable of being positioned to receive eggs released from the egg lifting devices while concurrently obstructing access of the egg lifting devices to the egg carrier. An associated method is also provided.

15 Claims, 9 Drawing Sheets

APPARATUS FOR REMOVING EGGS FROM EGG CARRIERS, AND ASSOCIATED METHOD

CROSS REFERENCE TO RELATED APPLICATION

This application claims the benefit of U.S. Provisional Patent Application No. 61/917,155, filed Dec. 17, 2013, which is expressly incorporated herein by reference in its entirety.

TECHNICAL FIELD

The present disclosure generally relates to egg handling devices and methods. More particularly, the present disclosure relates to an egg removal apparatus for removing and collecting avian eggs from egg carriers, and an associated method.

BACKGROUND

Discrimination between poultry eggs on the basis of some observable quality is a well-known and long-used practice in the poultry industry. "Candling" is a common name for one such technique, a term which has its roots in the original practice of inspecting an egg using the light from a candle. Eggs that are to be hatched are typically candled during embryonic development to identify live and non-live eggs. It is a common practice to separate non-live eggs from live eggs to increase available incubator space, to reduce the risk of contamination, and to save vaccine costs related to in ovo inoculations.

Conventionally, eggs designated as non-live may be removed either by hand or via an automated egg removal device such as disclosed, for example, in U.S. Pat. No. 6,145,668 to DePauw et al. and U.S. Pat. No. 6,149,375 to Hebrank. Automated egg removal devices may employ suction-type lifting devices as disclosed in U.S. Pat. No. 4,681,063 to Hebrank, U.S. Pat. No. 5,017,003 to Keromnes et al., and U.S. Pat. No. 7,083,208 to Ilich. The poultry industry is constantly looking for improved ways of removing eggs from carriers that are efficient, that reduce costs, and that reduce the risk of contamination to live eggs.

Accordingly, it would be desirable to provide an egg removal apparatus capable of efficiently removing eggs from egg carriers in a manner that allows for the removed eggs to be collected in an automated fashion. Furthermore, it would be desirable to provide an associated method that would remove and collect eggs from egg carriers in an automated and efficient manner.

BRIEF SUMMARY

The above and other needs are met by aspects of the present disclosure which, according to one aspect, provides an apparatus for removing eggs from an egg carrier. The apparatus includes a frame and an egg lifting system secured to the frame. The egg lifting system has an array of egg lifting devices configured to lift eggs from an egg carrier. A platform assembly is secured to the frame. The platform assembly has a platform configured to be moveably disposed between the array of egg lifting devices and the egg carrier such that the platform is capable of being positioned to receive eggs released from the egg lifting devices while concurrently obstructing access of the egg lifting devices to the egg carrier.

Another aspect provides a method of removing eggs from an egg carrier. The method comprises disposing a plurality of eggs contained within an egg carrier proximate to an egg lifting system having an array of egg lifting devices configured to lift eggs from the egg carrier. The method further comprises descending at least one of the egg lifting devices to engage a respective egg for removal thereof from the egg carrier. The method further comprises lifting the at least one egg lifting device and the respective egg. The method further comprises moving a platform between the egg carrier and the array of egg lifting devices. The method further comprises depositing any eggs removed from the egg carrier on the platform upon release from the egg lifting devices. The method further comprises moving the platform from between the egg carrier and the array of egg lifting devices such that the egg lifting devices are capable of descending to interact with eggs contained in a subsequent egg carrier.

Thus, various aspects of the present disclosure provide advantages, as otherwise detailed herein.

BRIEF DESCRIPTION OF THE DRAWINGS

Figure 1:
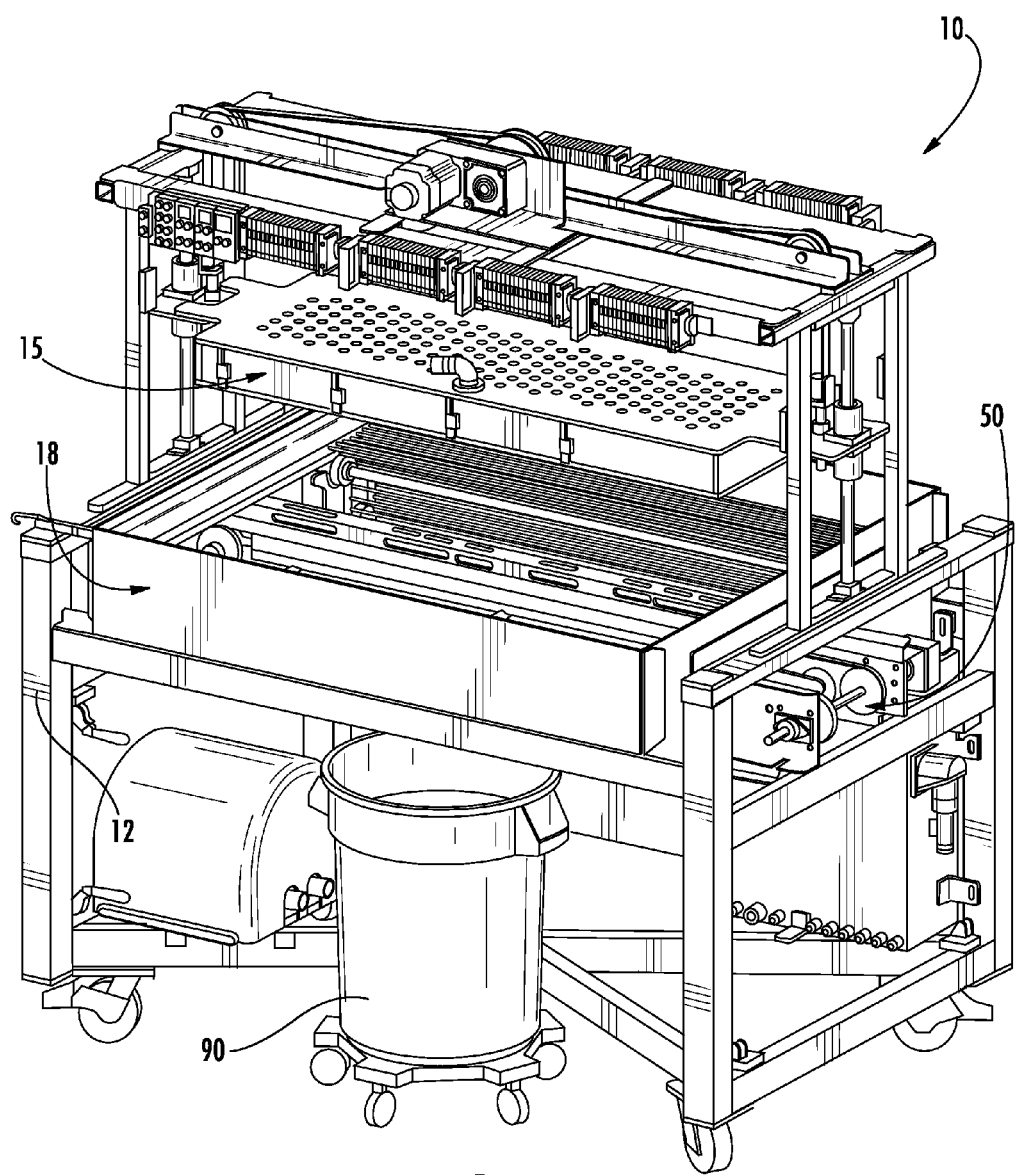
Figure 2:
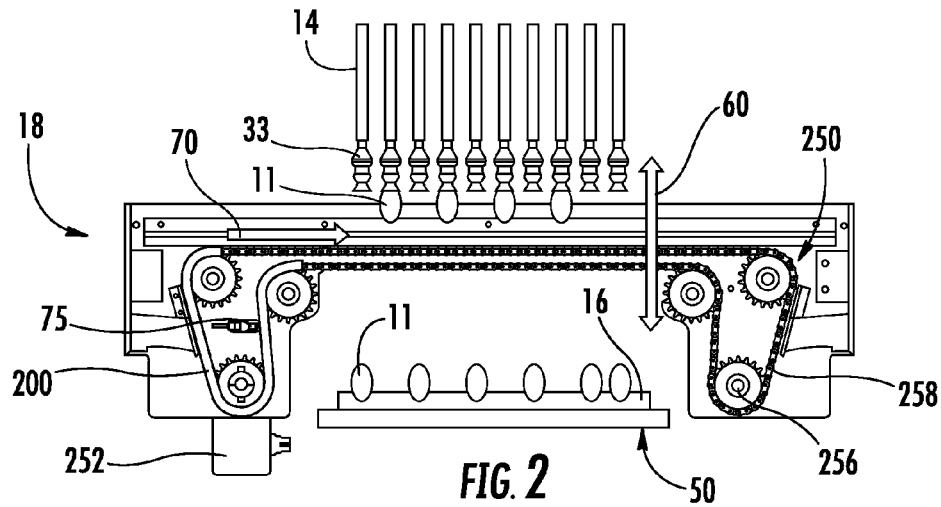
Figure 3:
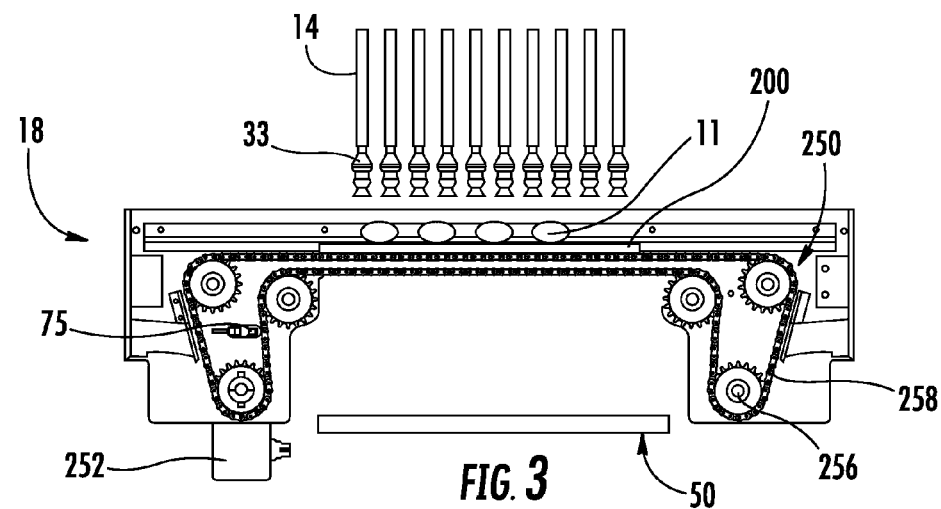
Figure 4:
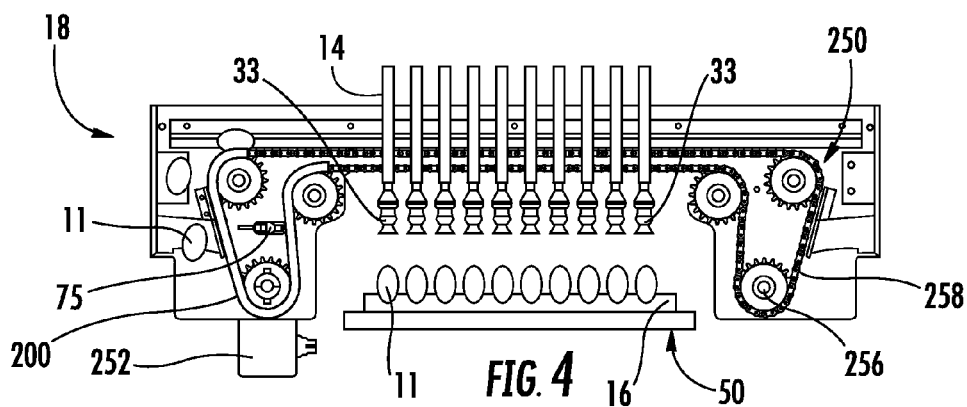
Figure 5:
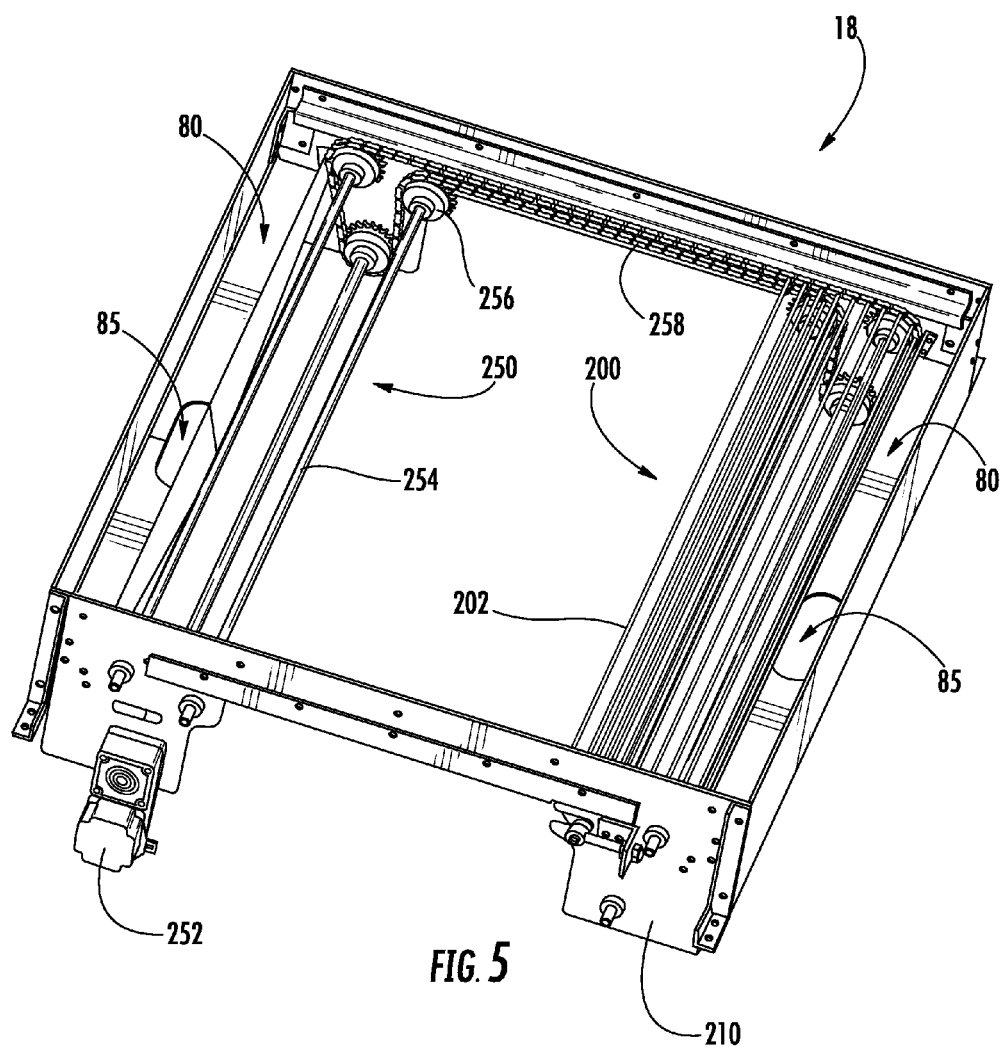
Figure 6:
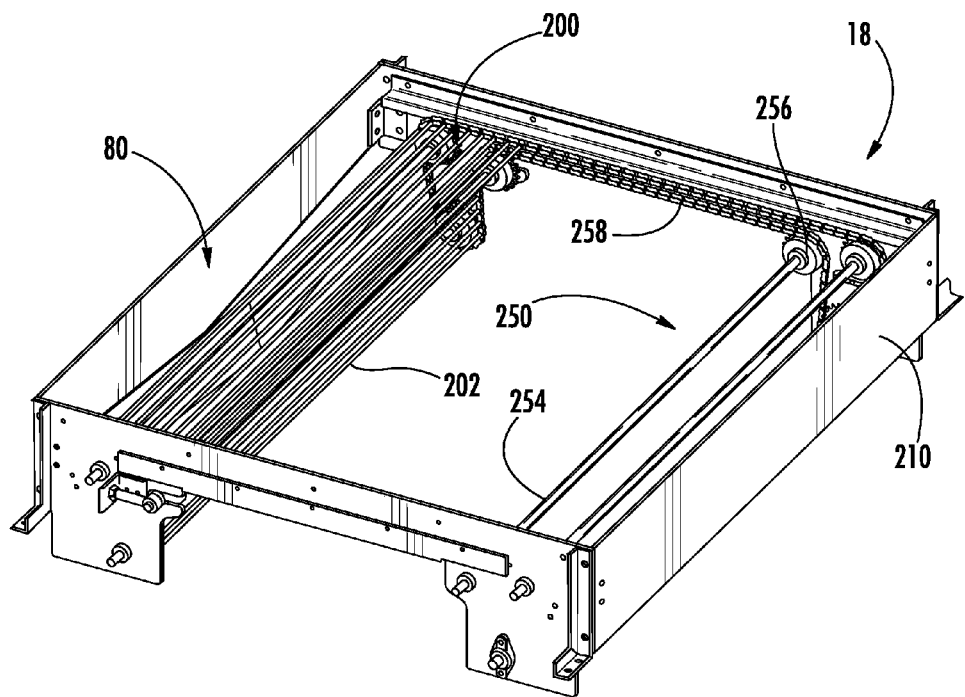
Figure 7:
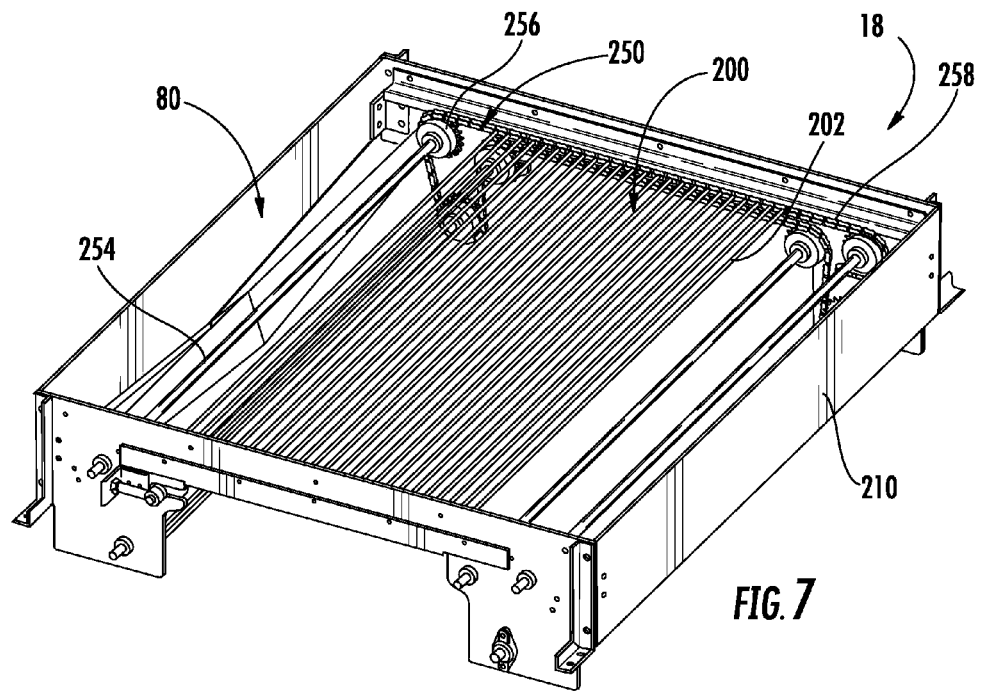
Figure 8:
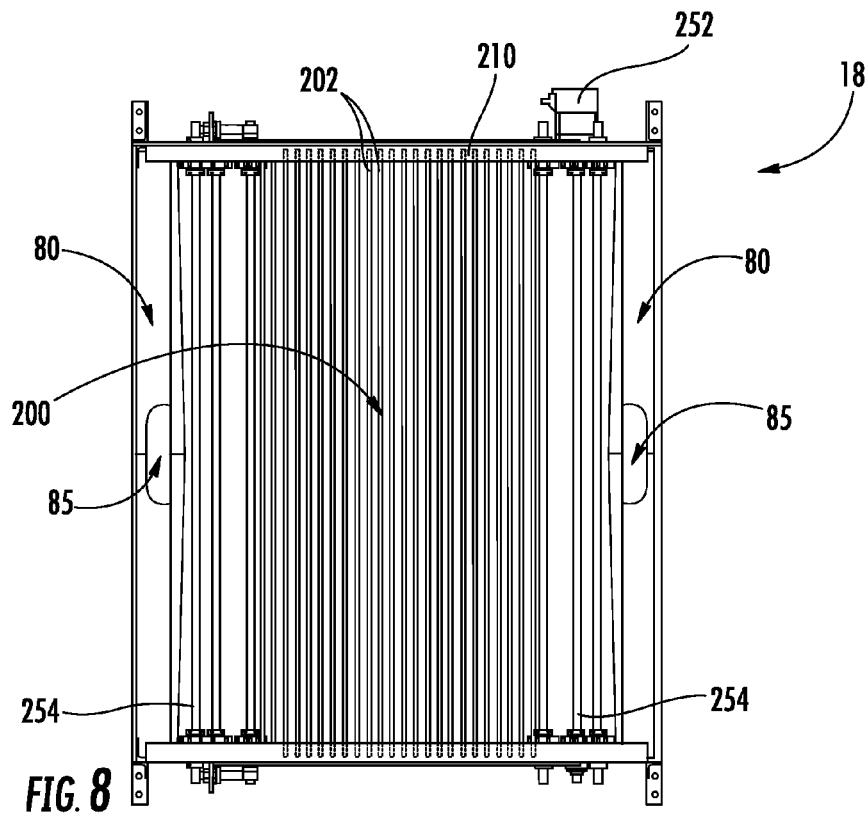
Figure 9:
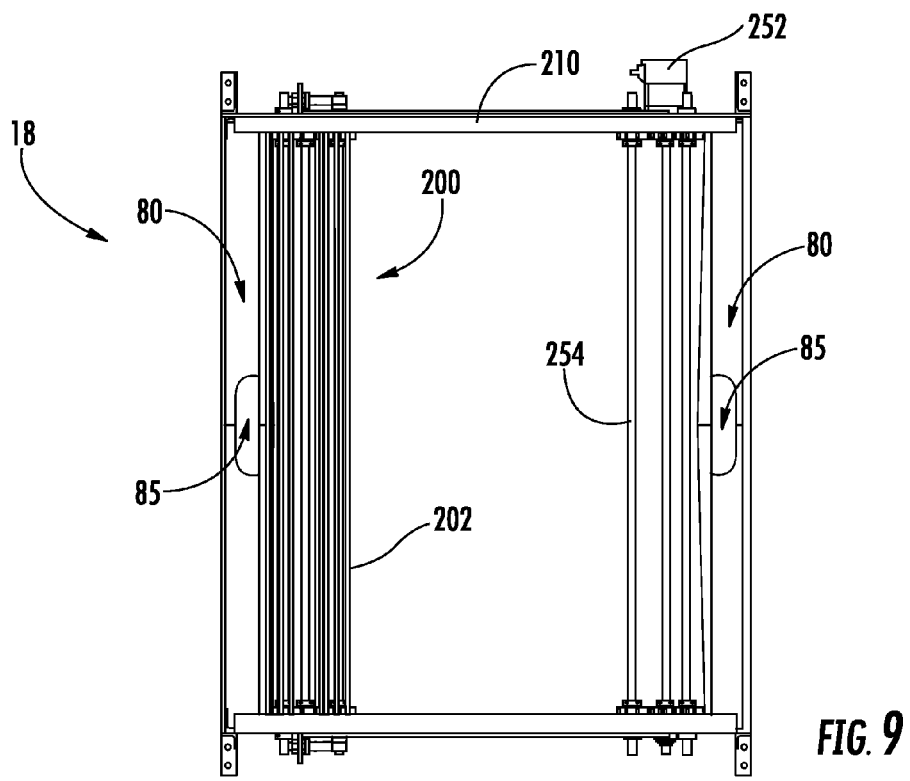
Figure 10:
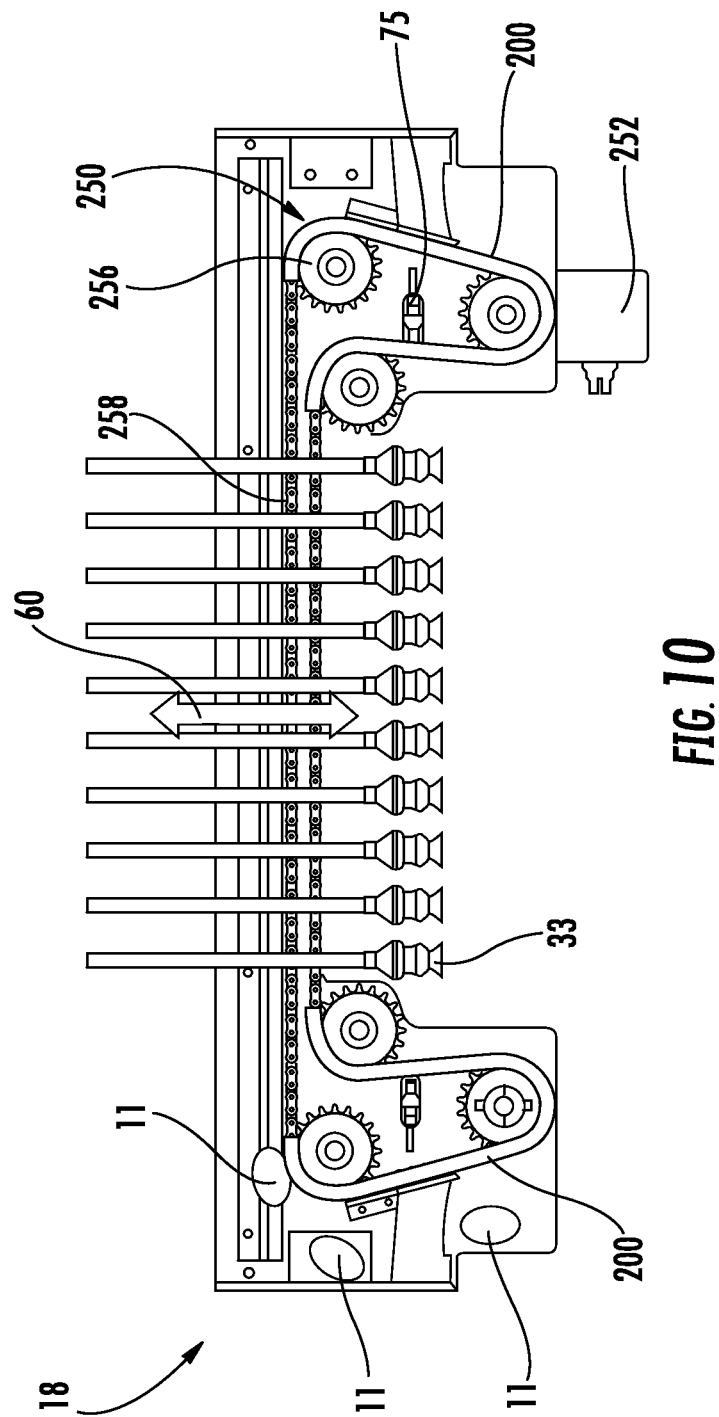
Figure 11:
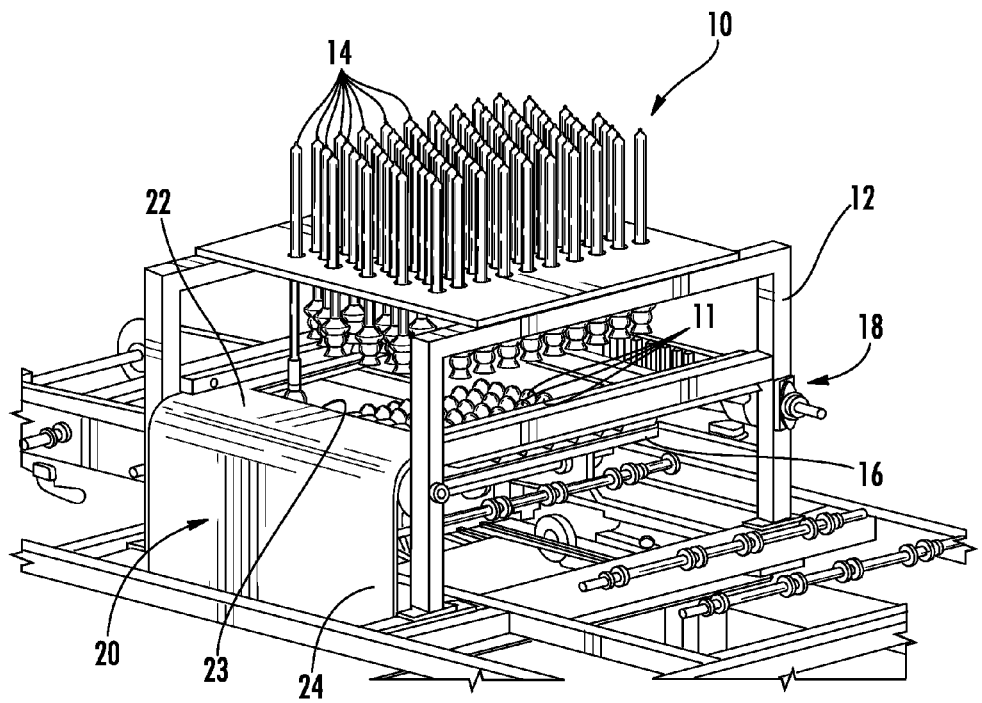
Figure 12:
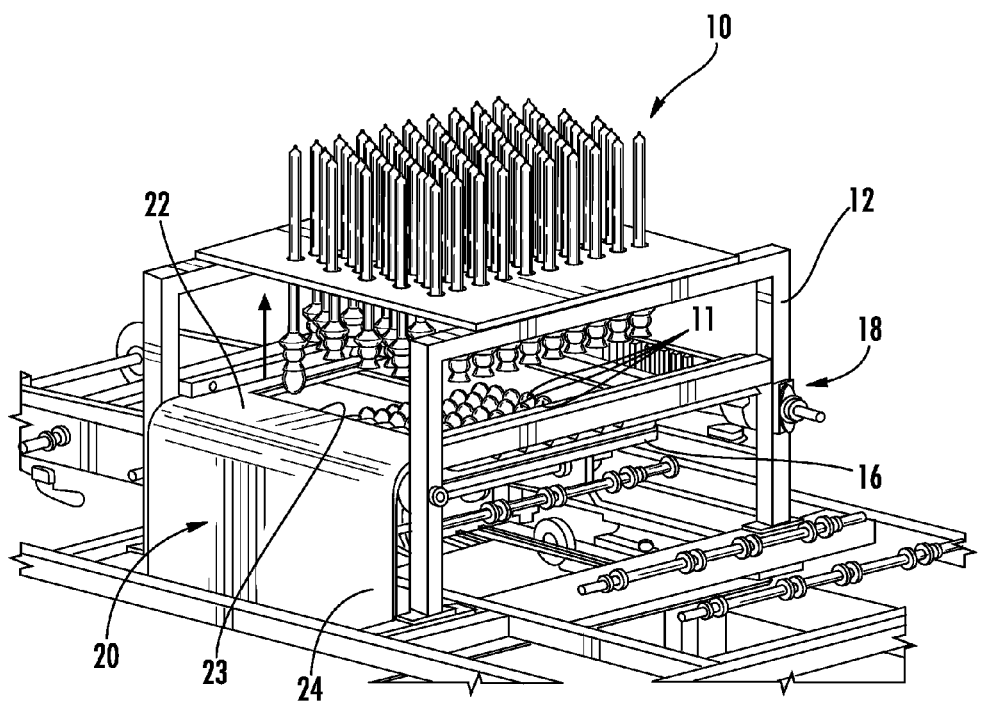
Figure 13:
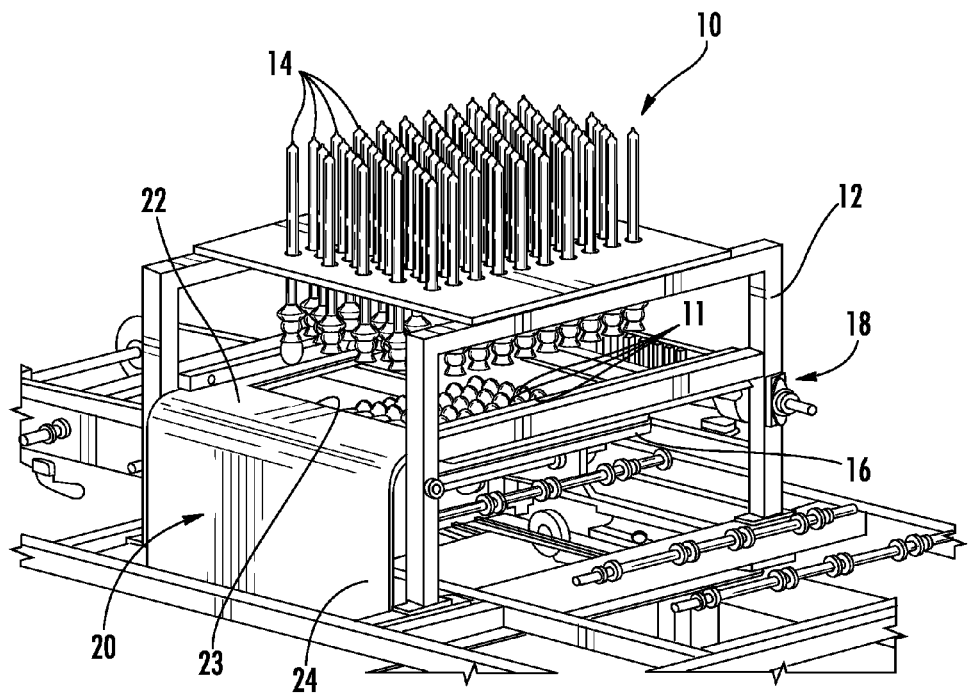

Having thus described various embodiments of the present disclosure in general terms, reference will now be made to the accompanying drawings, which are not necessarily drawn to scale, and wherein:

FIG. 1 is a perspective view of an apparatus for removing eggs from an egg carrier, according to one aspect of the present disclosure;

FIGS. 2-4 are schematic side views illustrating operation of an apparatus for removing eggs from an egg carrier, according to one aspect of the present disclosure;

FIGS. 5-7 are schematic perspective views of a platform assembly of an apparatus for removing eggs from an egg carrier, according to one aspect of the present disclosure;

FIGS. 8 and 9 are schematic top views of a platform assembly of an apparatus for removing eggs from an egg carrier, according to one aspect of the present disclosure;

FIG. 10 is a schematic side view of a platform assembly of an apparatus for removing eggs from an egg carrier, according to one aspect of the present disclosure; and FIGS. 11-15 are partial perspective views of another apparatus for removing eggs from an egg carrier, according to various aspects of the present disclosure.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

According to some aspects, the present disclosure is directed to apparatuses and methods for removing and collecting eggs from an egg carrier (a so-called "flat"). The aspects disclosed herein provide automated solutions to improve efficiencies, safety, and sanitary conditions related to removing eggs from egg carriers. For example, aspects of the present disclosure may allow for removal off eggs from egg carriers in which the overall lifting means for lifting the eggs from the egg carrier need only to move vertically, without any lateral or horizontal motion, in order to accomplish removal and disposal of the eggs. Such aspects may reduce the overall footprint of apparatus while also maintaining a suitable level of throughput. Further, aspects of the present disclosure may also provide improved means for collecting, preserving, and transporting eggs removed from the egg carrier to be used for various purposes.

The apparatus for removing eggs according to aspects of the present disclosure may be utilized for lifting and transferring various types and sizes of eggs and in conjunction with various egg processing techniques (e.g., in ovo inoculation, in ovo virus cultivations, etc.). The apparatus for removing eggs according to aspects of the present disclosure may be used with any types of avian eggs including, but not limited to, chicken eggs, turkey eggs, duck eggs, geese eggs, quail eggs, pheasant eggs, exotic bird eggs, etc.

Referring now to FIG. 1, an apparatus 10 for removing eggs from an egg carrier 16 (FIGS. 2 and 4), according to some aspects of the present disclosure, is illustrated. The illustrated apparatus 10 includes a frame 12, an egg lifting system 15 secured to the frame 12 that may be configured to lift respective eggs 11 from the carrier 16 positioned thereebeneath, and a platform assembly 18 also secured to the frame 12. The platform assembly 18 may include a platform 200 capable of being moveably positioned beneath an array of egg lifting devices 14 (not shown in FIG. 1 for purposes of clarity) of the egg lifting system 15 for receiving eggs 11 released therefrom. Each egg lifting device 14 may include a flexible cup 33 configured to engage and retain an egg 11 in seated relation therewith. A vacuum may be applied to the flexible cup 33 for removing the egg from the egg carrier 16. In some instances, the egg lifting devices 14 may be selectively deployed such that interaction of the flexible cups 33 with respective eggs may be selectively controlled. A conveyor assembly 50 may be secured to the frame 12 for automatically conveying the egg carriers 16 proximate to and beneath the egg lifting system 15.

Referring now to FIGS. 2-4, operation of the apparatus 10 according to one particular aspect is illustrated. As shown in FIG. 2, the egg lifting devices 14 have removed several eggs 11 from the egg carrier 16 supported by the conveyor assembly 50. In this regard, the egg lifting devices 14 have descended along a vertical line 60 such that the flexible cups 33 engage the eggs 11. The egg lifting devices 14 may then be lifted along the vertical line 60 and a vacuum applied to the respective flexible cups 33 such that the eggs 11 designated for removal are lifted from the egg carrier 16. In some instances, the egg lifting devices 14 may be individually controlled using, for example, individual pneumatic cylinders. In other instances, the egg lifting devices 14 may be commonly controlled using, for example, a manifold.

The platform 200 of the platform assembly 18 may be moved or extended in a direction 70 perpendicular to the vertical line 60 to an extended position such that the platform 200 may be positioned beneath the egg lifting devices 14 for receiving the eggs 11 thereon upon release from the egg lifting devices 14, as shown in FIG. 3. In this manner, the platform 200 may be moved or extended to an extended position such that the platform 200 restricts, obstructs, or otherwise blocks access of the egg lifting devices 14 to the eggs 11 in the egg carrier 16. After the eggs 11 are removed, the egg carrier 16 may be advanced along the conveyor assembly 50 such that a subsequent egg carrier 16 may be positioned beneath the egg lifting devices 14 to undergo the egg removal process, as shown in FIG. 4. The platform 200 may be moved or retracted to a retracted position such that the platform 200 is not restricting, obstructing, or blocking access of the egg lifting devices 14 to the eggs 11 in the egg carrier 16. The eggs 11 previously deposited onto the platform 200 may be transported and directed by the platform 200 to a designated area, as shown in FIG. 4.

As shown in FIGS. 5-9, according to one aspect of the present disclosure, the platform assembly 18 may include a platform frame 210 capable of being secured to the frame 12. The platform assembly 18 may include a drive assembly 250 for moving (e.g., extending/retracting or winding/unwinding) the platform 200. In some instances, the drive assembly 250 may include an actuator 252 configured to drive one or more shafts 254 coupled to respective gears or sprockets 256 engaged with an endless belt 258 (e.g., a chain). While the illustrated drive assembly 250 shows a sprocket/chain configuration, it will be understood that the present disclosure is not limited to such a configuration and instead may include other drive means or mechanisms such as, for example, a pulley/belt configuration. The platform 200 may be coupled, secured, or otherwise attached to the chain 258 such that movement of the chain 250 causes the platform to move also. In some instances, the drive assembly 250 may be arranged in a manner that allows the platform 200 to follow a serpentine path such that the platform 200 may be wound when in the retracted position (FIGS. 5, 6 and 9). Winding of the platform 200 may allow the egg carrier 16 and the egg lifting devices 14 to move without interference or waiting, which may increase cycle speed and save space for movement. FIGS. 7 and 8 illustrate the platform 200 in an extended position for receiving eggs deposited from the egg lifting devices 14.

The platform assembly 18 may include one or more receptacles or chutes 80 for receiving eggs 11 from the platform 200 and directing the eggs 11 to a designated location. In some instances, the chute 80 may define a hole 85 to which the eggs 11 transported to the chute 80 are directed to by gravity and the sloped shape of a bottom of the chute 80. Eggs 11 passing through the hole 85 may be collected by, for example, a bin 90 (FIG. 1). In other instances, the eggs 11 may be collected intact for use in other industries or for other purposes. Alternatively, one or more ramps or similar means may be provided for directing the eggs 11 to a bin, receptacle, or other processing means.

According to some aspects of the present disclosure, the platform 200 may comprise a plurality of spaced-apart members such as, for example, rods 202. The rods 202 may be appropriately spaced-apart to prevent eggs from falling therebetween, while also cradling the eggs to prevent rolling movement thereof during motion of the platform 200. In some instances, the rods 202 may be coated with or otherwise formed of a friction enhancing material to limit movement of the eggs 11 once received on the platform 200. In some aspects, the rods 202 may be formed of a plaint material such that the rods are resilient. In this regard, the rods 202 may be capable of flexing to reduce the impact of the eggs contacting the platform 200 upon release from the egg lifting devices 14, thereby reducing or limiting cracked eggs. The rods 202 may further provide the advantage of being easily removed, replaced, and cleaned.

While the aspects of the platform 200 illustrated in FIGS. 1 and 5-9 show the spaced-apart rod configuration, it will be understood that the platform 200 may have any appropriate make-up or configuration capable of providing a platform means upon which eggs may be deposited. For example, the rods 202 may be in a contacting relationship, rather than spaced-apart. In other instances, the platform 200 may be a single, unitary work piece such as a sheet or belt that could be rolled-up. In some instances, the platform 200 may include individual cups or cradles for receiving a respective egg aligned with the cup/cradle.

The apparatus 10 may be configured to efficiently process eggs therethrough by using an appropriate synchronization or timing scheme for conveying eggs through the apparatus 10, operating the egg lifting system 15, and operating the platform assembly 18. In this regard, the platform assembly 18 may include one or more sensors 75 (FIGS. 2-4 and 10) for determining or monitoring the position of the platform 200. A processor may be provided for controlling operation of the egg lifting system 15 and the conveyor assembly 50. The processor may be configured to receive a signal from the sensor 75 such that operation of the drive assembly 250 can be coordinated with the egg lifting system 15. In this manner operational efficiencies may be achieved such as, for example, the egg lifting devices 14 can begin descending before the platform 200 has entirely retracted into the retracted position, or an egg carrier 16 may be moved into the position for egg removal while eggs 11 from the previous egg carrier 16 are being processed by the egg lifting devices 14 and/or the platform 200. The processor may be further configured to receive a classification signal from a classifier (not shown) configured to identify and classify the eggs 11 as live or non-live. As such, the egg lifting system 15 may be capable of selectably deploying or actuating the individual egg lifting devices 14 as directed by the classifier.

Referring to FIG. 10, according to some aspects, a plurality of platforms 200 may be implemented to provide efficiencies and desired throughput. In this regard, in some instances, platforms 200 may be provided on either end of the platform assembly 18 such that the platforms 200 alternate receiving eggs released from the egg lifting devices 14. According to other aspects, the single platform configuration may be implemented in a manner in which the platform 200 moves from side to side of the platform assembly 18. In this regard, the platform 200 may be retracted on one side of the platform assembly 18 while dumping the eggs 11 released from the egg lifting devices 14 on the other side of the platform assembly 18 in the chute 80.

Figure 14:
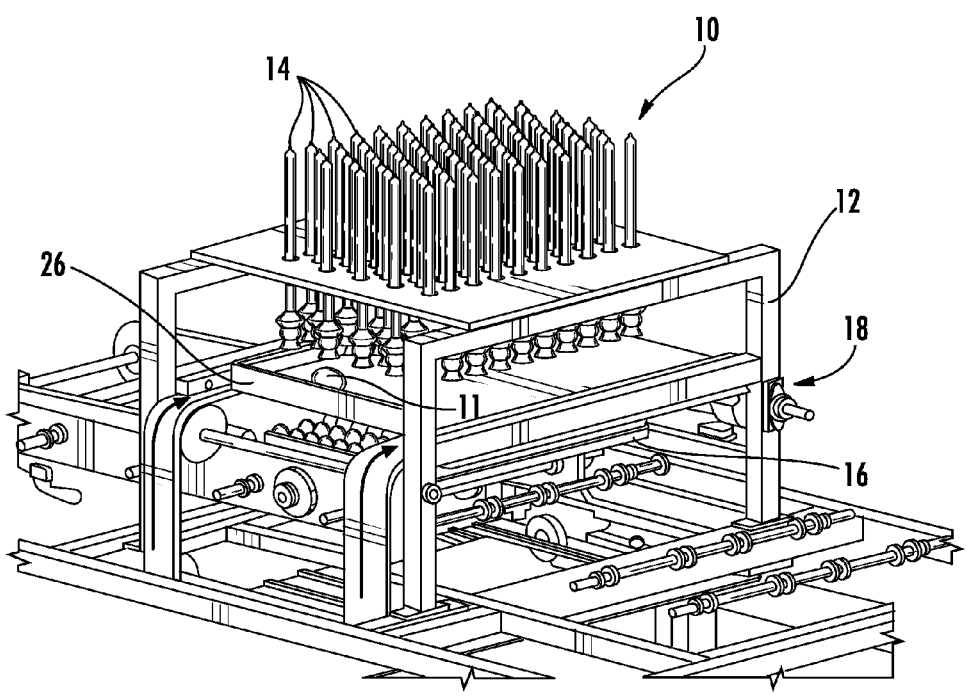
Figure 15:
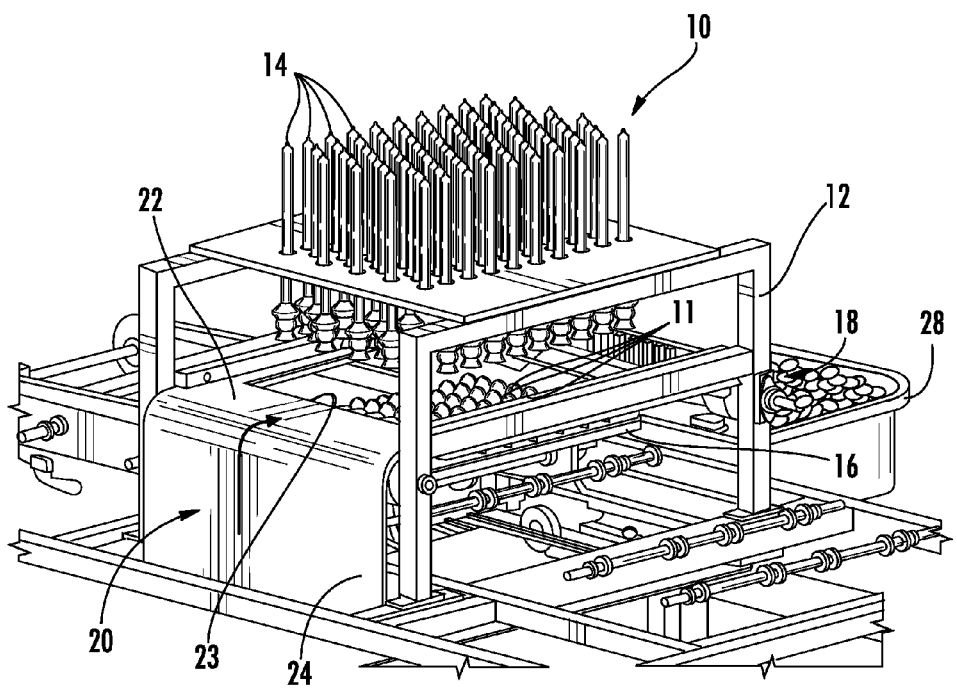

Referring now to FIGS. 11-15, an alternative apparatus 10 for removing eggs 11 from an egg carrier, according to some aspects of the present disclosure, is illustrated. The illustrated apparatus 10 includes the frame 12, the array of egg lifting devices 14 secured to the frame 12 that may be configured to lift respective eggs 11 from the carrier 16 positioned therebeneath, and the platform assembly 18 also secured to the frame 12. The platform assembly 18 may include an endless belt 20 positioned beneath the array of egg lifting devices 14. The endless belt 20 may include a first portion 22 having an opening 23 (FIGS. 11-13) through which one or more of the egg lifting devices 14 may be extended to lift respective eggs 11 from the carrier 16. The endless belt 20 may also include a second portion 24 on which eggs 11 lifted from the egg carrier 16 by the egg lifting devices 14 may be deposited or otherwise placed (FIG. 14).

The endless belt 20 may be rotatable between a first position (FIGS. 11-13) wherein the belt first portion 22 is positioned beneath the array of egg lifting devices 14 such that the egg lifting devices 14 have access to eggs 11 in the egg carrier 16 via the belt opening 23, and a second position (FIG. 14) wherein the belt second portion 24 is positioned beneath the egg lifting devices 14 such that the egg lifting devices 14 may deposit eggs 11 lifted from the egg carrier 16 thereon.

According to some aspects, one or more sensors may be utilized to detect the position of each egg lifting device 14. For example, a sensor may be utilized to detect if an egg lifting device 14 is extended downwardly through the belt opening 23 and, if so, rotation of the belt 20 may be prevented. Various types of sensors can be utilized including, but not limited to, light beam detectors, cameras, magnetic sensors, etc. In some instances, a single sensor may be capable of detecting the position of each egg lifting device 14 in the array. In other instances, a separate sensor for each row of egg lifting devices 14 in the array may be utilized.

Once eggs lifted from the egg carrier 16 are placed on the belt second portion 24, the belt 20 may be rotated to a third position wherein eggs on the belt 20 are moved to the receptacle 28 (FIG. 15) or to other processing equipment. As illustrated in FIG. 14, the belt second portion 24 may include a wall 26 that extends across the belt 20. Wall 26 may facilitate removal of eggs from the belt 20 as the belt 20 is rotated to the third position. However, aspects of the present disclosure are not limited to the structure and/or orientation of the illustrated belt 20 and wall 26.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An apparatus for removing eggs from an egg carrier, the apparatus comprising:
    a frame defining a footprint;
    an egg lifting system secured to the frame, the egg lifting system having an array of egg lifting devices configured to lift eggs from an egg carrier; and
    a platform assembly secured to the frame, the platform assembly having a platform configured to be moveably disposed between the array of egg lifting devices and the egg carrier such that the platform is capable of being positioned to receive eggs released from the egg lifting devices while concurrently obstructing access of the egg lifting devices to the egg carrier, the platform assembly further having a drive assembly configured to wind and unwind the platform such that the platform is capable of being moveably disposed between the array of egg lifting devices and the egg carrier.

2. An apparatus according to claim 1, wherein the drive assembly comprises a plurality of gears configured to wind and unwind the platform.

3. An apparatus for removing eggs from an egg carrier, the apparatus comprising:
    a frame;
    an egg lifting system secured to the frame, the egg lifting system having an array of egg lifting devices configured to lift eggs from an egg carrier; and
    a platform assembly secured to the frame, the platform assembly having a platform configured to be moveably disposed between the array of egg lifting devices and the egg carrier such that the platform is capable of being positioned to receive eggs released from the egg lifting devices while concurrently obstructing access of the egg lifting devices to the egg carrier, wherein the platform comprises a plurality of spaced-apart rods.

4. An apparatus according to claim 3, wherein the rods are pliant.

5. An apparatus according to claim 1, further comprising a conveyor assembly secured to the frame and configured to convey an egg carrier proximate to the egg lifting system, and wherein the platform is capable of being movably disposed between the array of egg lifting devices and the conveyor assembly.

6. An apparatus according to claim 5, further comprising a synchronization system having a processor, at least one sensor, and a drive assembly, the synchronization system being configured to synchronize operation of the platform assembly, conveyor assembly, and egg lifting system.

7. An apparatus for removing eggs from an egg carrier, the apparatus comprising:
a frame;
an egg lifting system secured to the frame, the egg lifting system having an array of egg lifting devices configured to lift eggs from an egg carrier; and
a platform assembly secured to the frame, the platform assembly having a platform configured to be moveably disposed between the array of egg lifting devices and the egg carrier such that the platform is capable of being positioned to receive eggs released from the egg lifting devices while concurrently obstructing access of the egg lifting devices to the egg carrier, wherein the platform assembly comprises an endless belt having a first portion defining an opening through which the egg lifting devices are extendable to lift eggs from the carrier, and a second portion on which eggs lifted from the egg carrier by the egg lifting devices are capable of being deposited.

8. An apparatus according to claim 7, wherein the endless belt is rotatable between a first position wherein the belt first portion is positioned proximate to the array of egg lifting devices such that the egg lifting devices have access to eggs in the egg carrier and a second position wherein the belt second portion is positioned proximate to the egg lifting devices such that the egg lifting devices are capable of depositing eggs lifted from the egg carrier thereon.

9. An apparatus according to claim 8, further comprising a receptacle, and wherein the endless belt is rotatable to a third position wherein eggs on the endless belt are moved to the receptacle.

10. A method of removing eggs from an egg carrier, the method comprising:
disposing a plurality of eggs contained within an egg carrier proximate to an egg lifting system secured to a frame defining a footprint, the egg lifting system having an array of egg lifting devices configured to lift eggs from the egg carrier;
descending at least one of the egg lifting devices to engage a respective egg for removal thereof from the egg carrier;
lifting the at least one egg lifting device and the respective egg;
unwinding a platform such that the platform is extended between the egg carrier and the array of egg lifting devices;
depositing any eggs removed from the egg carrier on the platform upon release from the egg lifting devices; and
winding the platform such that the platform is retracted from between the egg carrier and the array of egg lifting devices such that the egg lifting devices are capable of descending to interact with eggs contained in a subsequent egg carrier.

11. A method according to claim 10, wherein descending at least one of the egg lifting devices to engage a respective egg for removal thereof from the egg carrier further comprises descending at least one of the egg lifting devices within a platform assembly to engage a respective egg for removal thereof from the egg carrier.

12. A method according to claim 10, wherein disposing a plurality of eggs contained within an egg carrier proximate to an egg lifting system further comprises conveying a plurality of eggs contained within an egg carrier to a position such that the eggs are aligned with a respective egg lifting device.

13. A method according to claim 10, wherein unwinding a platform comprises unwinding the platform via a drive assembly having a plurality of gears, and further wherein winding the platform comprises winding the platform via the drive assembly.

14. A method of removing eggs from an egg carrier, the method comprising:
disposing a plurality of eggs contained within an egg carrier proximate to an egg lifting system having an array of egg lifting devices configured to lift eggs from the egg carrier;
descending at least one of the egg lifting devices to engage a respective egg for removal thereof from the egg carrier;
lifting the at least one egg lifting device and the respective egg;
extending a platform formed of a plurality of spaced-apart rods between the egg carrier and the array of egg lifting devices;
depositing any eggs removed from the egg carrier on the platform upon release from the egg lifting devices; and
retracting the platform from between the egg carrier and the array of egg lifting devices such that the egg lifting devices are capable of descending to interact with eggs contained in a subsequent egg carrier.

15. A method of removing eggs from an egg carrier, the method comprising:
disposing a plurality of eggs contained within an egg carrier proximate to an egg lifting system having an array of egg lifting devices configured to lift eggs from the egg carrier;
descending at least one of the egg lifting devices within an opening defined by an endless belt to engage a respective egg for removal thereof from the egg carrier;
lifting the at least one egg lifting device and the respective egg;
moving a platform between the egg carrier and the array of egg lifting devices by rotating the endless belt such that the opening is moved away from the egg lifting devices such that the deposited eggs are capable of being received on the endless belt;
depositing any eggs removed from the egg carrier on the platform upon release from the egg lifting devices; and
moving the platform from between the egg carrier and the array of egg lifting devices such that the egg lifting devices are capable of descending to interact with eggs contained in a subsequent egg carrier.

\* \* \* \* \*